United States Patent
Bohrer et al.

(10) Patent No.: US 11,146,950 B2
(45) Date of Patent: Oct. 12, 2021

(54) METHOD FOR CONSIGNING A FUNCTION OF AN ELECTRICAL DEVICE AND ELECTRICAL DEVICE IMPLEMENTING THIS METHOD

(71) Applicant: Schneider Electric Industries SAS, Rueil-Malmaison (FR)

(72) Inventors: Roland Bohrer, La Sure en Chartreuse (FR); Christophe Robichon, Varces Allieres Et Risset (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 0 days.

(21) Appl. No.: 16/357,376

(22) Filed: Mar. 19, 2019

(65) Prior Publication Data

US 2019/0297492 A1 Sep. 26, 2019

(30) Foreign Application Priority Data

Mar. 22, 2018 (FR) .................... 18 52477

(51) Int. Cl.
*H04W 12/04* (2021.01)
*H04W 12/041* (2021.01)
(Continued)

(52) U.S. Cl.
CPC ......... *H04W 12/041* (2021.01); *E05B 67/383* (2013.01); *G06F 21/10* (2013.01); *G06F 21/44* (2013.01); *G06F 21/629* (2013.01); *H01H 9/20* (2013.01); *H01H 9/281* (2013.01); *H01H 27/007* (2013.01); *H01H 47/002* (2013.01); *H04L 9/0819* (2013.01);
(Continued)

(58) Field of Classification Search
CPC ........ H04W 12/0401; H04W 12/04031; E05B 67/383; G06F 21/10; G06F 21/44; G06F 21/629; H01H 9/20; H01H 9/281; H01H 27/007; H01H 47/002; H04L 9/0819; H04L 9/0869; H04L 9/0894
USPC ....................................... 340/5.61
See application file for complete search history.

(56) References Cited

U.S. PATENT DOCUMENTS 6,477,021 B1 11/2002 Haun et al.
2009/0140061 A1* 6/2009 Schultz .............. G05B 19/0425
236/51
(Continued)

OTHER PUBLICATIONS

French Preliminary Search Report dated Feb. 14, 2019 in French Application 18 52477, filed on Mar. 22, 2018 (with English Translation of Categories of cited documents and Written Opinion).

*Primary Examiner* — Omar Casillashernandez
(74) *Attorney, Agent, or Firm* — Oblon, McClelland, Maier & Neustadt, L.L.P.

(57) ABSTRACT

A method for consigning a function of an electrical device includes: a) receiving a request to consign a function implemented by a sub-assembly of the electrical device, the request being transmitted by a client terminal connected to the control unit via a short-range communication link; b) generating a digital key including a unique identifier; c) storing one copy of the generated key in a memory of the control unit and sending another copy of the generated key to the client terminal that transmitted the request; d) consigning the function so as to prevent this function of the device from being used by the control unit as long as the consignation is active.

15 Claims, 4 Drawing Sheets

(51) Int. Cl.

| | | |
|---|---|---|
| *E05B 67/38* | (2006.01) | |
| *H04L 9/08* | (2006.01) | |
| *G06F 21/62* | (2013.01) | |
| *G06F 21/10* | (2013.01) | |
| *H01H 47/00* | (2006.01) | |
| *H01H 27/00* | (2006.01) | |
| *G06F 21/44* | (2013.01) | |
| *H01H 9/28* | (2006.01) | |
| *H01H 9/20* | (2006.01) | |
| *H04W 12/0431* | (2021.01) | |

(52) U.S. Cl.
CPC .......... *H04L 9/0869* (2013.01); *H04L 9/0894* (2013.01); *H04W 12/0431* (2021.01)

(56) References Cited

U.S. PATENT DOCUMENTS

| | | | |
|---|---|---|---|
| 2014/0232524 A1* | 8/2014 | Nakai | B60R 25/24 |
| | | | 340/5.61 |
| 2015/0077224 A1* | 3/2015 | Pal | G06F 21/35 |
| | | | 340/5.61 |
| 2015/0168487 A1 | 6/2015 | Parker et al. | |
| 2016/0225562 A1* | 8/2016 | Franks | H02H 3/006 |
| 2018/0068095 A1* | 3/2018 | Yamazaki | H04L 12/28 |
| 2019/0189378 A1* | 6/2019 | Lagree | H02G 5/08 |

\* cited by examiner

METHOD FOR CONSIGNING A FUNCTION OF AN ELECTRICAL DEVICE AND ELECTRICAL DEVICE IMPLEMENTING THIS METHOD

The present invention relates to a method for locking out a function of an electrical device. The invention relates also to an electrical device implementing this method.

The invention applies more generally to the field of the electrical devices used in electrical installations, in particular electrical protection devices, electrical measurement devices or electrical switching devices, and more particularly devices for breaking an electrical current such as circuit breakers, contactors or disconnectors.

Such an electrical device can be locked out temporarily by one or more users during a maintenance operation, during which this or these users have to work on a part of the device or on an electrical installation associated with this device. When a function of the device is locked out, that is to say locked, no other user can interfere with this function. That allows the user to work in total safety without being hampered by an unlocking or an unexpected use of this function by another user. Thus, the lockout makes it possible to ensure the safety of the installations and of the users and to guarantee that only the person having locked out the device can lift this lockout.

As an illustrative and nonlimiting example, in the case of a circuit breaker installed upstream of an electrical installation, the user opens the circuit breaker to interrupt the electrical power supply then locks out the circuit breaker to prevent another user from being able to then reclose the circuit breaker and restore the electrical power supply to the installation while he or she is working on the installation.

Typically, the lockout is ensured by mechanical lock means, such as padlocks or latches, which serve to block a control member in a predefined position. In other cases, the lock means aim to prevent other users from accessing this control member.

The use of mechanical lock means does however present many drawbacks. It requires direct physical access to the electrical device, which is sometimes difficult to ensure when the device is placed in a confined environment or in an inaccessible location. It is complicated to put in place when several users are required to work on one and the same device. It is also difficult to implement in installations of large size, where the user is required to lock out several devices that may be remote from one another. The lock means can be forced by an unauthorized user or disconnected by a cutting tool and therefore lead to an unauthorized lifting of the lockout.

It is these drawbacks that the invention sets out more particularly to remedy, by proposing an electrical device, and an associated method, in which a functionality of the device can be locked out in an improved manner.

To this end, the invention relates to a method for locking out a function of an electrical device, such as an electrical protection device or an electrical measurement device or an electrical switching device, this method comprising:

a) receiving, by an electronic control unit of the electrical device, a request to lock out a function implemented by a sub-assembly of the electrical device, the request being transmitted by a client terminal connected to the control unit via a short-range communication link;

b) automatically generating, by the control unit, a digital key comprising a unique identifier;

c) storing one copy of the generated key in a memory of the control unit and sending another copy of the generated key to the client terminal that transmitted the request;

d) locking out the function, by a digital lock module of the control unit, so as to prevent this function of the device from being used by the control unit as long as the lockout is active.

By virtue of the invention, the lockout of the function is performed intangibly using a digital key and a logical lock ensured by the electronic control unit of the electrical device. The use of mechanical lock means is therefore no longer necessarily required.

According to aspects of the invention that are advantageous but not mandatory, such a method can incorporate one or more of the following features, taken in isolation or according to any technically admissible combination:

the method also comprises the lifting of the lockout of the function previously locked out by means of the steps a) to d), this method comprising:

a') the reception, by the electronic control unit of the electrical device, of a request to lift the lockout of the function previously locked out, the release request being transmitted by the same client terminal, this client terminal being connected to the control unit by a short-range communication link;

b') in response, the acquisition, by the control unit, of a copy of the digital key retained by the client terminal having sent the release request;

c') the comparison of the copy of the acquired digital key with the copy of the generated key stored in the memory, the request to lift the lockout of the function being denied if the acquired key does not match the stored key;

d') the automatic verification, by the control unit, of the existence, recorded in the control unit, for this function, of at least one other digital key associated with another client terminal, this verification being implemented only if the acquired key is determined to match the stored key in the memory, the lifting of the lockout of the function by the digital lock module being authorized only if there is no such other digital key, the lockout of the function by the digital lock module being maintained if there is at least one such other digital key.

The electrical device comprises a mechanical lock interface intended to receive a mechanical lock member to mechanically lock out the function of the electrical device independently of the digital lock module of the control unit, and in which, in the step d'), if the lifting of the lockout of the function by the digital lock module is authorized, the control unit determines the state of the mechanical lock interface and, if the mechanical lock interface is determined to be in the locked state, the control unit sends a notification to the client terminal.

The step b) is implemented only if the client terminal is previously authenticated as being authorized to request the lockout of the function.

The authentication of the client terminal is ensured by means of a remote authentication server connected to the electronic control unit via a communication link different from the short-range communication link.

The short-range data link is a wired link or a point-to-point wireless link whose range is less than or equal to 5 metres.

During each operation performed by the digital lock module following a request received from a client terminal, the control unit automatically records, in an event log stored in memory, tracking information on the operation including in particular an identifier of the user who is the originator of the request.

The unique identifier is generated as a function of a random or pseudo-random element.

The control unit acquires a request for partial lockout of the function, the request being transmitted by a client terminal connected to the control unit by a network link different from the short-range communication link and, in response, the digital lock module of the control unit partially locks out the function, so as to partially limit the use of this function of the device by the control unit, the partial lockout being lifted in the step d) and replaced by the lockout of the function.

According to another aspect, the invention relates also to an electrical device, such as an electrical protection device or an electrical measurement device or an electrical switching device or a supervisory or communication device, comprising a sub-assembly capable of implementing a function and an electronic control unit programmed to:

a) receive a request to lock out the function implemented by the sub-assembly, the request being transmitted by a client terminal connected to the control unit by a short-range communication link;

b) automatically generate a digital key comprising a unique identifier;

c) store a copy of the generated key in a memory of the control unit and send another copy of the generated key to the client terminal having transmitted the request;

d) lock out the function, by a digital lock module of the control unit, so as to prevent the use of this function of the device by the control unit as long as the lockout is active.

The invention will be better understood and other advantages thereof will become more clearly apparent in light of the following description, of an embodiment of an electrical device given purely as an example and with reference to the attached drawings in which.

Figure 1:
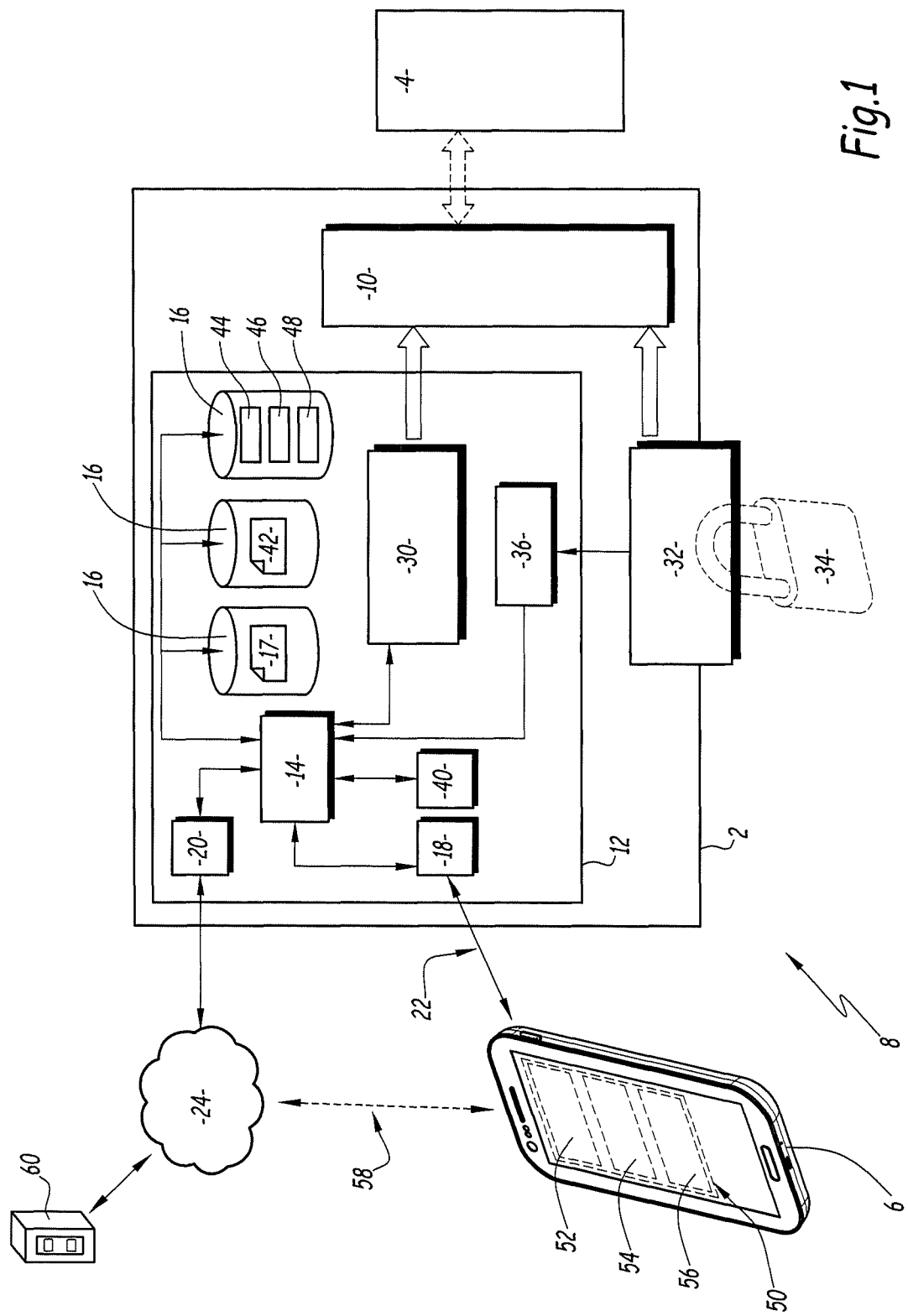
FIG. 1 is a schematic representation of an electrical device according to the invention.

FIG. 1 represents an example of an electrical device 2 associated with an electrical installation 4. For example, the installation 4 is an electricity distribution installation intended to electrically power one or more power devices, here in an industrial or home environment. In this example, the electrical device 2 is connected to the installation 4 to control, supervise or protect all or part of the installation 4.

According to different embodiments, the electrical device 2 is an electrical protection device, or an electrical measurement device, or an electrical switching device, in particular an electrical breaking device. It can also be a supervisory device or a communication device such as a network switch or a device of "automatic transfer switch" type.

In this illustrative example, the device 2 is a circuit breaker or a contactor or a disconnector suitable for interrupting the electrical power supply of the installation 4 in case of the detection of an electrical fault or in response to a command from a user.

FIG. 1 also represents an electronic client terminal 6 which forms, with the device 2, a system 8 and whose role is described in more detail hereinbelow.

The device 2 comprises at least one sub-assembly 10 which implements a function of the device 2. For example, the sub-assembly 10 comprises one or more electromechanical, or electrical, or magneto-electrical, or electronic devices, or any other equivalent device. Hereinbelow, the reference "10" is used to denote the function implemented by the sub-assembly 10. The function 10 depends on the nature of the device 2 and, preferably, is linked to the installation 4. Depending on the case, it may be an electrical protection function of the installation 4, or an electrical current breaking function, or even a measurement function for measuring one or more electrical quantities. The function 10 can be controlled by a user of the device 2.

For example, in the case of a circuit breaker or of a contactor, the sub-assembly 10 is an electrical current breaking member connected upstream of the installation 4, so as to allow the electrical power supply of the installation 4 to be interrupted. The function associated with this sub-assembly 10 corresponds to the switching of the breaking member between electrically open and closed states.

The function ensured by the sub-assembly 10 is adapted to be locked out by a user. A function here is said to be "locked out" by a user when it is placed by this user in a specific state, or in a specific configuration, and other users are prevented from modifying the state or the configuration of the sub-assembly 10. Likewise, this function is then said to be "locked" or "engaged". The other users cannot modify this function as long as it has not been "released", or, in other words, "unlocked" or "disengaged", by the user who set the lockout.

In the illustrative case of a circuit breaker for which the sub-assembly 10 is a breaking member, then the lockout of the function 10 amounts to blocking the breaking member in one of its states, preferably the open state, so as to prevent other users from switching it to another state.

According to another illustrative example, the sub-assembly 10 is a trip of an electrical current breaking device. This trip is parameterized by a triggering curve which defines the response of the trip as a function of the measured value of an electrical quantity, such as the value of the electrical current. The locking out of the corresponding function then consists in selecting a specific triggering curve different from the triggering curve used in the nominal operation of the device. This specific triggering curve, sometimes known as "Energy Reduction Maintenance Setting", is for example defined to limit the risks in the vicinity of the circuit breaker when the latter is tripped by the occurrence of an electrical fault when a user is working on the installation 4.

In the following description, a single sub-assembly 10 is described in the interests of simplicity, but, in practice, according to other embodiments, the device 2 can comprise several sub-assemblies 10 ensuring multiple different functions. It is therefore understood that the description that is given of this sub-assembly 10 can be transposed to these other embodiments.

The device 2 also comprises an embedded electronic control unit 12. The unit 12 is intended to control the operation of the device 2.

In particular, the unit 12 is adapted to interact with the sub-assembly 10, in particular to authorize remote control and supervision of the corresponding function. The function 10 can thus be controlled via the unit 12, remotely for example by virtue of the terminal 6, or locally from a control panel installed on the front panel of the device 2 and connected to the unit 12. The unit 12 also makes it possible to supervise the lockout of the function 10, as explained hereinbelow.

The unit 12 comprises a computation logic unit 14, such as a microprocessor or a microcontroller, a computer memory 16, a short-range communication interface 18 and a network interface 20.

The memory 16 preferably comprises one or more non-volatile memory modules, for example of Flash or EEPROM technology or any other equivalent storage technology. The memory 16 comprises in particular executable instructions 17, such as machine code that can be executed by the unit 14 and/or instructions that can be interpreted by an interpreter run by the unit 14, allowing in particular the implementation of the lockout and release methods of FIGS. 2 and 3.

The interface 18 is adapted to establish a short-range data interchange link 22, for example with the client terminal 6. For example, the short-range data link 22 is a wired link or a point-to-point wireless link whose range is less than or equal to 5 metres. As an illustrative example, it is a wireless link of "Bluetooth® Low Energy" type. As a variant, it is a wired link, for example of USB type.

The network interface 20 makes it possible to establish a communication link with a remote computer network 24, such as the internet network. The communication link can be wired, for example of Ethernet type, or wireless, for example of WiFi type.

The device 12 also comprises a digital lock module 30 adapted to lockout the function implemented by the sub-assembly 10. The module 30 is, here, implemented by the unit 12, for example by software using specific instructions implemented by the unit 14, or using a dedicated electronic circuit of the unit 12. Hereinbelow, the lockout implemented by the lock module 30 is called "electronic lockout".

For example, when the function 10 is locked out by means of the module 30, the latter prevents controlling the function 10 from the unit 12, whether via a client terminal 6 connected to the unit 12, or via a control panel on the front panel of the device 2 or through the network interface 20.

According to optional embodiments, the device 2 is configured in such a way that the function 10 can be locked out mechanically independently of the electronic lockout ensured by virtue of the module 30. To this end, the device 2 comprises a mechanical lock interface 32 intended to receive a mechanical lock member 34 such as a padlock or a latch. In this case, the unit 12 advantageously comprises a measurement system 36, for example including a mechanical position sensor, which detects the state of the interface 32 and which generates a corresponding state signal, making it possible to deduce the presence or absence of a mechanical lock member 34.

As an example, the interface 32 comprises a mechanical device intended to be associated with a control member situated on the front panel of the device 2 acting on the function 10, such as a lever or a rotary knob or a pushbutton or a keypad. This mechanical device is configured to prevent the actuation of this control member by any user as long as the interface 32 is locked by the member 34.

In practice, the interface 32 can be placed removably on the device 2 by being intended to be placed only when a member 34 is on the point of being placed then locked, then to be removed as soon as the presence of the member 34 is no longer required. The measurement system 36 therefore detects the presence or, alternatively, the absence, of the interface 32. Thus, even if the measurement system 36 does not necessarily measure the state of the lock member 34, the information that it gives on the presence or the absence of the interface 32 makes it possible to extrapolate the state of the member 34 and therefore indirectly determine whether the function 10 is mechanically locked out or not.

According to other variants, the member 34 and the interface 32 are incorporated in the device and the system 36 directly measures the locked or unlocked state of the interface 32.

The interface 32 makes it possible to offer the user the possibility of retaining a mechanical lock independent of the digital lockout functions, while allowing the latter to operate on the basis of knowing the mechanical lockout state.

As a variant, the device 2 cannot be locked mechanically. Then, the interface 32 and the system 36 are omitted, as is the member 34.

According to preferred implementations, the electronic lockout is ensured by virtue of a digital key 46 generated by the unit 12. More specifically, the unit 12 comprises a generation module 40 for generating a unique digital key when a client terminal 6 requests the lockout of the function 10. This key is associated with this client terminal, for example by including a unique identifier. The unit 12 is programmed to keep the function 10 locked out as long as at least one such digital key is active, here using the lock module 30. The unit 12 also comprises a state indicator 44 which indicates the locked out or non-locked out state of the function 10, and a table 48 listing the active digital keys 46, that is to say the generated keys for which a lockout of the function 10 is active.

For example, the unit 40 is implemented as software by the unit 12. As a variant, the unit 40 is an electronic circuit, for example a cryptographic module. The unit 40 generates the unique identifier by means of a predefined generation function from data which are supplied as input for the generation function.

In some embodiments, the unique identifier is at least partly generated from information exchanged with the client terminal 6 having requested the lockout of the function 10, such as a connection identifier of the user having requested the lockout or even information relating to the terminal 6, such as a network address or a physical address of the terminal 6, in particular an MAC ("Media Access Control") address.

For example, the unique identifier is also generated from instantaneous time information such as the date and time.

Advantageously, the unique identifier is also generated by the unit 12 from a random or pseudo-random element. As a variant, the random or pseudo-random element is acquired by the unit 12, for example generated by the terminal 6 then transmitted to the unit 12.

In this example, the unique identifier is a string of alphanumeric characters or of numbers, for example hexadecimal numbers. The length of the unique identifier is greater than or equal to 64 bits, preferably greater than or equal to 128 bits.

According to one example, the unique identifier is an identifier of "UUID" type, UUID standing for "Universally Unique Identifier" as defined by the document "RFC 4122" from the "Internet Task Force" organization or by the ISO/IEC 9834-8 standard. The generation function implemented by the module 40 is therefore adapted accordingly.

Theoretically, the identifiers generated by means of such functions cannot be absolutely unique and there is an extremely low probability, generally lower than $10^{-12}$, of two identical identifiers being generated by one and the same function. However, in practice, this probability is so low that, within the meaning of the present description, such an identifier can be considered to be unique.

The table 48 here generically denotes a data structure which resides in memory 16, of list, array, vector, database or tree type, or any other appropriate data structure, in which each active digital key is associated with an element which identifies the client terminal 6 for which the corresponding key has been generated.

When several lockouts are requested independently by different users, as many digital keys 46 are generated and are stored in the memory 16. The table 48 is updated accordingly.

The client terminal 6 comprises:
  an executable application 50 which contains a storage area 52 for storing at least one copy of the digital key 46,
  a table 54 containing information on associations between the digital key or keys stored in the area 52 and an element identifying the corresponding device 2, and
  a human-machine interface 56.

For example, the client terminal 6 comprises a computation logic unit of microprocessor type, a computer memory, a communication interface compatible with the interface 18 to establish a communication link 22 with the device 2, and also comprises an operating system, for example run by the computation unit by virtue of the executable instructions stored in memory of the client terminal 6. According to examples, the client terminal 6 is a computer or a mobile communication device such as a telephone or a tablet. The application 50 is run within the operating system.

The use of an application 50 installed on a client terminal 6 makes it possible for example to not require the user to make use of a piece of electronic hardware specifically designed to use the electronic lockout. On the contrary, the user can install the application 50 on an already existing mobile communication device that he or she is required to use elsewhere in the context of his or her functions. That therefore simplifies the implementation of the system 8.

The lockout and release requests are sent from the client terminal 6, which must then be located in proximity to the device 2 to be able to connect to the latter by the short-range link 22. As long as the function 10 is locked out, the user having requested the lockout remains in possession of the client terminal 6 which contains a copy of the corresponding digital key. This key is not intended to be duplicated by the user or to be copied on another client terminal. There is thus here a security level at least equivalent to that ensured by the known mechanical lockout systems.

One and the same terminal 6 can be used to lockout several functions 10 in turn on one or more devices 2 independently of one another.

Advantageously, the unit 12 comprises an event logging system configured to record in an event log 42, for example recorded in a memory 16, the events relating to the lockout of the function 10. For example, the unit 12 is configured so that, upon each operation performed by the digital lock module 30 following a request received from a client terminal 6, the control unit 12 automatically records, in the event log 42, tracking information on the operation including in particular an identifier of the user who originated the request, even also the date and the time of the operation and the nature of the operation. That makes it possible to ensure a traceability of the use of the lockout functions of the device 2.

According to an implementation that is not illustrated, the unit 12 is also programmed to send a notification such as an alert message to the client terminal or terminals identified in the register 48 in case of fault or error in the lockout of the function 10, for example when the lockout can no longer be assured, or when an administrator demands a lifting of the lockout. The corresponding users can thus be alerted immediately of the lifting of the lockout and can stop their work to avoid any accident.

Advantageously, the unit 12 is also programmed to send notifications to the user or, likewise, to the corresponding client terminal, in response to an action of the user, for example to confirm that a lockout has been put in place or to confirm that the lockout has been lifted.

According to optional implementations, the unit 12 is also programmed to force the lifting of the lockout of the function 10, that is to say authorize a specific user to request the lifting of the lockout of the function 10 even though this specific user is different from the user having requested the lockout of the function 10 and does not have the terminal 6 or the copy 52 of the corresponding key. For example, the specific user is an administrator of the system and has extended security permissions. For example, the administrator must previously be authenticated with the unit 12. Preferably, when the lifting of the lockout is forced, the unit 12 sends a notification to the user having requested the lockout in order to warn him or her of the imminent lifting of the lockout.

Figure 2:
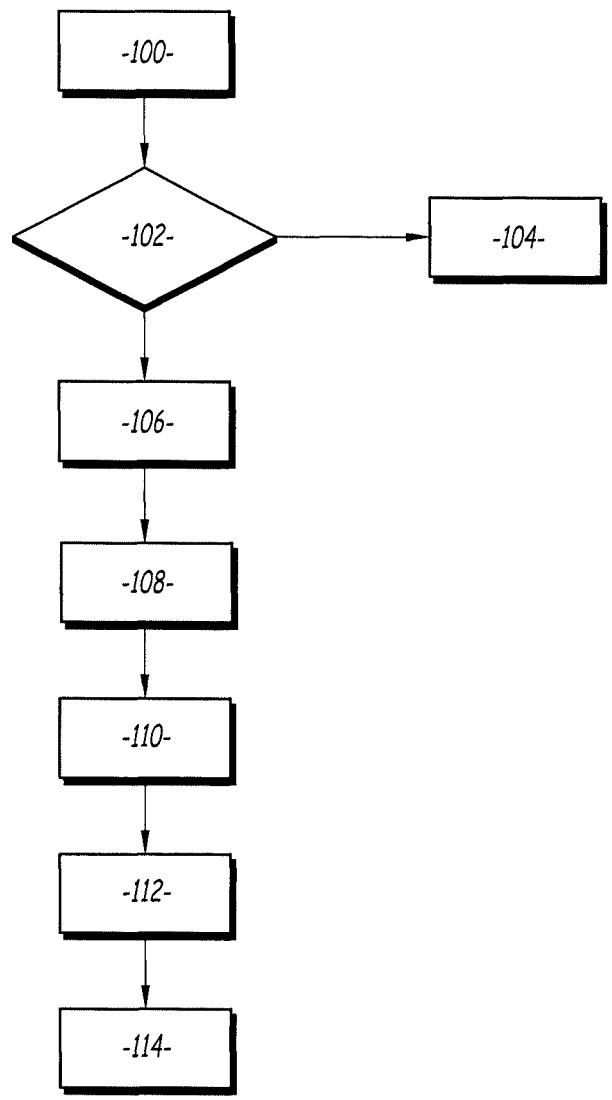
FIG. 2 is a flow diagram of a method for locking out a function of the electrical device of FIG. 1.

An example of operation of the device 2 and of the system 8 is now described with reference to the flow diagram of FIG. 2 to lockout the function 10.

Initially, a user sends a lockout request for the function 10 from the client terminal 6.

For example, the user uses the interface 56 of the application 50 to generate this request and send it to the device 2. The request can be preceded by a phase of pairing of the terminal 6 with the device 2, for example to establish the link 22. The terminal 6 can also first receive information sent by the unit 12 indicating the lockout state of the function 10, for example based on the state indicator 44, to indicate whether another user has already locked out the function 10, whether using the module 30 or, if appropriate, mechanically by means of the interface 32.

The request is sent via the short-range link 22, which guarantees that the user is in proximity to the device 2.

According to embodiments, an authentication of the user can be requested, for example to verify that the user is authorized to transmit such a request. For example, the application 50 prompts the user to supply identification data, such as a predefined personal password. The authentication can also, and/or additionally, depending on the context and the permitted cases of use, be based on identification information specific to the user or to the terminal 6 or to the application 50, such as a serial number or a network address or a physical address such as an MAC address, or any other personalized identifier. Such identification data and/or information is preferably know to the unit 12, for example recorded in an access rights register stored in the memory 16 or in the authentication server 60.

Then, in a step 100, the unit 12 receives the request transmitted by the client terminal 6.

If appropriate, in a step 102, the unit 12 automatically verifies the authentication information sent by the terminal 6, for example from the access rights register. This verification can be done by interrogating the authentication server 60, for example to verify that the identification data received correspond to a user who is authorized to transmit such a request.

If the authentication fails, for example because the user is not authorized to transmit such a request, then, in a step 104, the request is denied without the function 10 being locked out. Optionally, the event log 42 is updated accordingly to record the lockout attempt.

If the authentication succeeds, or even if no authentication is requested, then, in a step 106, the unit 12 automatically generates a digital key 46 comprising the unique identifier. The key 46 is, here, generated by means of the key generator 40 as described previously.

Then, in a step 108, the unit 12 automatically stores the generated key in the memory 16. It advantageously updates the list 48 to associate with this key information identifying the user having transmitted the request.

In this step 108, the unit 12 sends a copy of the key 46 to the terminal 6 having transmitted the request. Advantageously, the unit 12 also sends, associated with this key, information making it possible to identify the device 2, such as a serial number or a predefined identification number.

The copy of the key is received by the application 50 by means of the link 22. The copy of the received key is stored in a memory space 52 of the terminal 6 and associated with the identifier of the device 2, for example a memory space 52 defined by the application 50. Once stored in the space 52, the copy of the key is not intended to be copied or transmitted to another user.

For example, the access to the memory space 52 is protected by the application 50 so as to prohibit any access to the content of this memory space 52 which would not be authorized by the application 50.

In a step 110, the unit 12 authorizes the lockout of the function 10. Here, the unit 12 activates the lock module 30 for it to lock out the function 10. Once the lockout is activated, the lock module 30 prevents unexpected access to the function 10 via the unit 12.

For example, in the case where the sub-assembly 10 is a trip parameterized by the trigger curve previously described, then the parameters of the trigger curve can no longer be modified unexpectedly by another user. It is understood however that that does not prevent the device 2 from operating, particularly in the event of a trip, in as much as the mechanism of the breaking member is then not physically blocked.

In the example illustrated, the unit 12 also updates the state indicator 44 to indicate that the function 10 is locked out.

Optionally, the event log 42 is updated accordingly in a step 112 to record the activation of the lockout associated with this user.

A confirmation is finally sent to the client terminal 6 in a step 114 to indicate that the lockout has been accepted.

At this stage, the function 10 cannot be modified or altered, either by the user having requested the lockout or by other users.

It is therefore understood that the function 10 remains locked out by the lock module 30 as long as there is at least one key 46 generated by the unit 12 which is stored in the memory 16 and declared in the table 48. In other words, a digital key 46 is active as long as it is declared in the table 48.

In practice, other users can, in turn, request the lockout of the function 10, independently of one another, according to a method similar to that described above, and by using their client terminal 6. A corresponding key is generated each time in the same way as described above. Thus, several different keys 46 can be stored in the memory 16. An element identifying the users associated with each of these keys 46 is stored in the table 48. Similarly, other users may have requested and obtained the lockout of the function 10 prior to the step 100 described above.

Figure 3:
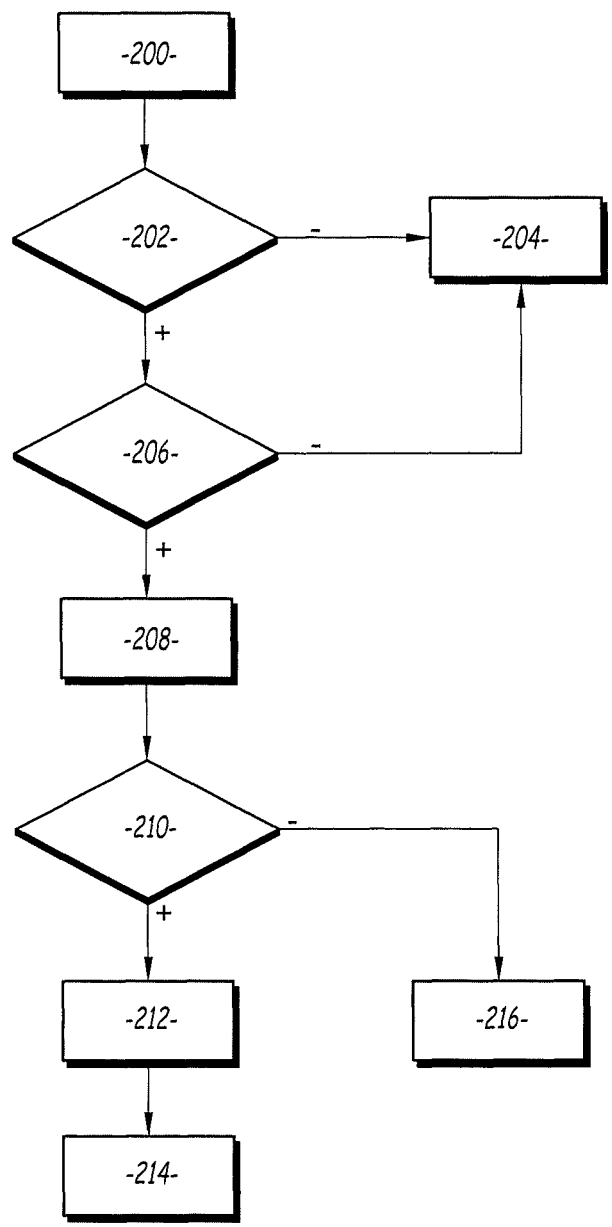
FIG. 3 is a flow diagram of a method for releasing a function of the electrical device of FIG. 1, this function having been previously locked out by means of the method of FIG. 2.

An example of operation of the device 2 and of the system 8 is now described with reference to the flow diagram of FIG. 3 for lifting the lockout of the function 10, this lockout having been put in place by means of the method of FIG. 2.

Initially, a user sends a request to lift the lockout of the function 10 from the client terminal 6. Preferably, it is the same user as the one having requested the lockout and the request is sent from the same client terminal as the one having previously requested the lockout.

For example, the user uses the interface 56 of the application 50 to generate this request and send it to the device 2. The request can be preceded by a phase of pairing of the terminal 6 with the device 2, for example to re-establish the link 22 if the latter was interrupted from the step 100. The terminal 6 can also first receive information sent by the unit 12 indicating the lockout state of the function 10, for example based on the state indicator 44, to indicate whether other users have, in the meantime, locked out the function 10, whether using the module 30 or, if appropriate, mechanically by means of the interface 32.

The request is sent via the short-range link 22, which guarantees that the user is in proximity to the device 2.

In a step 200, the control unit 12 receives the release request. The control unit 12 acquires a copy of the digital key retained by the client terminal 6 having sent the release request. For example, this key is sent by the client terminal 6 with the release request.

According to embodiments, an authentication of the user can be requested, for example to verify that the user is authorized to transmit such a request. Thus, if appropriate, in a step 202, the unit 12 automatically verifies the authentication information sent by the terminal 6. For example, the authentication is done in a way similar to that described with reference to the step 100.

If the authentication fails, for example because the user is not authorized to transmit such a request, then, in a step 204, the request is denied without the function 10 being released. Optionally, the event log 42 is updated accordingly to record the release attempt.

If the authentication succeeds, or else if no authentication is requested, then, in a step 206, the unit 12 automatically compares the copy of the digital key acquired with the copy of the generated key 46 stored in the memory 16. The request to lift the lockout of the function is denied if the acquired key does not match the stored key. For example, the step 204 is then implemented.

On the contrary, if the acquired key is determined to match the key 46 stored in the memory 16, then, in a step 210, the control unit 12 automatically verifies whether there is, recorded in the control unit 12, for this function, at least one other active digital key associated with another client terminal. For example, the unit 12 searches to see whether there are other keys 46 listed in the table 48 and associated with client terminals 6 other than the one having transmitted the request.

The lifting of the lockout of the function 10 by the digital lock module 30 is authorized only if the comparison shows that there is no such other active digital key associated with this function 10.

Thus, if no other key is identified as being active for this function 10, then, in a step 212, the unit 12 authorizes the lock module 30 to lift the lockout. For example, the unit 12 dereferences the key 46 from the table 48 by deleting the corresponding entry. The unit 12 also destroys the key 46 retained in the memory 16.

Advantageously, in a step 214, the log 42 is updated to record a tracking of the operation of lifting of the lockout of the function 10.

Otherwise, if the comparison implemented in the step 210 reveals that there is at least one other digital key 46 active for this function 10, then the lockout of the function 10 by the digital lock module 30 is maintained in a step 216.

Preferably, although not mandatory, an alert is sent to the client terminal 6 to inform the user originating the request that his or her request has been accepted and that the corresponding key has been revoked, but that the function 10 cannot be unlocked because there are other active keys.

If appropriate, the unit 12 can send to the client terminal information on the identity of the user or users and their client terminal 6 who are associated with the other active keys, based on the information contained in the register 48. For example, such information allows the application 50 to send a message to the client terminal 6 of the corresponding user. The sending of such information can be restricted to only certain users based on security privileges granted to the other users, for example based on personal data protection policies.

It is therefore understood that the lockout of the function 10 can be totally lifted only when all the keys 46 associated with this function 10 have been deleted by the unit 12.

By virtue of the invention, the lockout of the function is performed intangibly using the key 46 and a logic lock provided by the unit 12, such that the use of mechanical lock means is therefore no longer required. The device 2 can therefore have its functions 10 locked out with a security level at least equivalent to that traditionally ensured by the known mechanical lockout means.

Furthermore, the electronic lockout implemented by the unit 12 offers advantages over just the mechanical lockout means, such as, for example, the traceability that is automatically ensured by virtue of the event log 42, or even the facility whereby several users can lockout one and the same function independently of one another. Even in the cases where mechanical lock means are used in conjunction with the unit 12, the use of the interface 32 described above associated with the system 36 allows the unit 12 to have information on the state of the mechanical lock.

Figure 4:
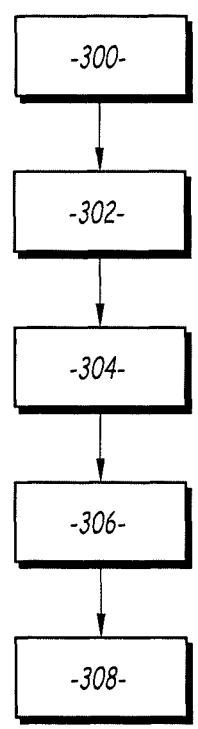
FIG. 4 is a flow diagram of a method for partially locking out a function of the electrical device of FIG. 1.

According to an optional embodiment described in FIG. 4, the steps described above for locking out the function 10 can be preceded by a pre-lockout phase, also called partial lockout phase.

Such a phase is advantageous in certain applications, for example when the function 10 has to be placed in a degraded operating mode, or in a maintenance mode, before the user is authorized to approach the device 2.

Thus, prior to the step 100 previously described, the user sends a request for partial lockout of the function 10, preferably with the same client terminal 6 as that which will be used in the step 100.

In a step 300, the control unit 12 acquires the request for partial lockout of the function 10. Preferably, to transmit this request, the client terminal 6 is connected to the control unit by a network link that is different from the short-range communication link. For example, the terminal 6 is connected to the network 24 by the link 58. In fact, at this stage, the user is not situated in proximity to the device 2, such that the client terminal 6 cannot communicate with the device 2 via the short-range link 22.

In response to this request, the lock module 30 partially locks out the function 10 in a step 302, so as to partially limit the use of this function 10 by the control unit 12. Once the function 10 is partially locked out, the user can approach the device 2.

Then, in a step 304, the terminal 6 sends a request to lock the function 10 to implement the step 100 of the method of FIG. 1. Then, once the unit 12 authorizes the locking of the function 10, the partial lockout is lifted in a step 306 before being replaced by the lockout of the function 10 in a step 308 similar to the step 110.

The embodiments and the variants envisaged above can be combined with one another to generate new embodiments.

The invention claimed is:

1. A method for locking out a function of an electrical device, comprising:
   a) receiving, by an electronic controller of the electrical device, a request to lock out a function implemented by a sub-assembly of the electrical device, the request being transmitted by a client terminal connected to the electronic controller via a short-range communication link, the electrical device including one of an electrical protection device, an electrical measurement device, or an electrical switching device;
   b) automatically generating, by the electronic controller, a digital key comprising a unique identifier of the client terminal and a connection identifier corresponding to a user requesting to lock out the function implemented by the sub-assembly of the electrical device;
   c) storing one copy of the digital key in a memory of the electronic controller and sending another copy of the digital key to the client terminal that transmitted the request; and
   d) locking out the function, by a digital lock module of the electronic controller, to prevent said function of the device from being used by the electronic controller as long as the lockout is active,
   wherein the locking out of the function is lifted based on receipt of a request including a digital key that matches the one copy of the digital key stored in the memory of the electronic controller and based on no other digital key copies being stored in the memory of the electronic device, the locking out of the function being maintained if there is at least one other digital key copy stored in the memory of the device.

2. The method according to claim 1, wherein lifting of the lockout of the function previously locked out with steps a) to d) includes:
   a') receiving, by the electronic controller of the electrical device, of the request, the request being transmitted by the same client terminal, said client terminal being connected to the electronic controller by the short-range communication link;
   b') in response, acquiring, by the electronic controller, of a copy of the digital key retained by the client terminal having sent the release request;
   c') comparing of the copy of the acquired digital key with the one copy of the digital key stored in the memory, the request being denied if the acquired key does not match the stored key;
   d') automatically verifying, by the electronic controller, of existence, recorded in the electronic controller, for said function, of at least one other digital key associated with another client terminal, said verification being implemented only if the acquired key is determined to match the stored key in the memory, lifting the lockout of the function by the digital lock module being authorized only if there is no such other digital key, the lockout of the function by the digital lock module being maintained if there is at least one such other digital key.

3. The method according to claim 2, wherein the electrical device comprises a mechanical lock interface configured to receive a mechanical lock member to mechanically lock out the function of the electrical device independently of the digital lock module of the electronic controller, and wherein, in the step d'), if the lifting of the lockout of the function by the digital lock module is authorized, the electronic controller determines a state of the mechanical lock interface and, if the mechanical lock interface is determined to be in a locked state, the electronic controller sends a notification to the client terminal.

4. The method according to claim 1, wherein the step b) is implemented only if the client terminal is previously authenticated as being authorized to request the lockout of the function.

5. The method according to claim 4, wherein the authentication of the client terminal is ensured with a remote authentication server connected to the electronic controller via a communication link different from the short-range communication link.

6. The method according to claim 1, wherein the short-range data link is a wired link.

7. The method according to claim 1, wherein, on each operation performed by the digital lock module following a request received from a client terminal, the electronic controller automatically records, in an event log stored in memory, tracking information on the operation including in particular an identifier of a user who originates the request.

8. The method according to claim 1, wherein the unique identifier is generated as a function of a random or pseudo-random element.

9. The method according to claim 1, wherein, prior to the step a):

the electronic controller acquires a request for partial lockout of the function, the request being transmitted by a client terminal connected to the electronic controller by a network link different from the short-range communication link;

in response, the digital lock module of the electronic controller partially locks out the function, so as to partially limit the use of said function of the device by the electronic controller, the partial lockout being lifted in the step d) and replaced by the lockout of the function.

10. An electrical device, comprising:

a sub-assembly configured to perform a function; and an electronic controller configured to:

a) receive a request to lock out the function implemented by the sub-assembly, the request being transmitted by a client terminal connected to the electronic controller by a short-range communication link;

b) automatically generate a digital key comprising a unique identifier of the client terminal and a connection identifier corresponding to a user requesting to lock out the function implemented by the sub-assembly of the electrical device;

c) store a copy of the digital key in a memory of the electronic controller and send another copy of the digital key to the client terminal having transmitted the request;

d) lockout the function, by a digital lock module of the electronic controller, to prevent use of said function of the device by the electronic controller as long as the lockout is active, wherein the lock out of the function is lifted based on receipt of a request including a digital key that matches the one copy of the digital key stored in the memory of the electronic controller and based on no other digital key copies being stored in the memory of the electronic device, the locking out of the function being maintained if there is at least one other digital key copy stored in the memory of the device, and the electrical device includes one of an electrical protection device or an electrical measurement device or an electrical switching device.

11. The method according to claim 1, wherein the unique identifier includes a Media Access Control (MAC) address of the client terminal.

12. The method according to claim 11, wherein the digital key is generated based, at least partially, on a current date and time.

13. The method according to claim 1, wherein the short range data link is a point-to-point wireless link whose range is less than or equal to 5 meters.

14. The method according to claim 1, wherein the electrical device is a circuit breaker.

15. The electrical device according to claim 10, wherein the electrical device is a circuit breaker.

* * * * *